(12) United States Patent
Wang

(10) Patent No.: US 10,738,991 B2
(45) Date of Patent: Aug. 11, 2020

(54) LIGHT-EMITTING BASIN

(71) Applicant: Quanzhou Viition Gifts Co., LTD, Fujian Province (CN)

(72) Inventor: Peijun Wang, Fujian Province (CN)

( * ) Notice: Subject to any disclaimer, the term of this patent is extended or adjusted under 35 U.S.C. 154(b) by 267 days.

(21) Appl. No.: 15/008,458

(22) Filed: Jan. 28, 2016

(65) Prior Publication Data
US 2017/0016593 A1  Jan. 19, 2017

(30) Foreign Application Priority Data

Jul. 16, 2015 (CN) .................... 2015 2 0516653 U

(51) Int. Cl.
| | |
|---|---|
| F21V 33/00 | (2006.01) |
| A01K 45/00 | (2006.01) |
| A47K 1/04 | (2006.01) |
| A01K 5/01 | (2006.01) |
| F21W 131/10 | (2006.01) |
| F21W 121/00 | (2006.01) |
| A01G 9/02 | (2018.01) |
| F21S 9/03 | (2006.01) |

(52) U.S. Cl.
CPC ............ *F21V 33/00* (2013.01); *A01K 5/0114* (2013.01); *A01K 45/002* (2013.01); *A47K 1/04* (2013.01); *A01G 9/02* (2013.01); *F21S 9/032* (2013.01); *F21W 2121/00* (2013.01); *F21W 2131/10* (2013.01); *Y02B 20/72* (2013.01)

(58) Field of Classification Search
CPC ....... F21W 2131/107; F21W 2131/109; F21V 33/00
See application file for complete search history.

(56) References Cited

U.S. PATENT DOCUMENTS

| | | | | |
|---|---|---|---|---|
| 2,125,635 | A * | 8/1938 | Hobart .................... | F21S 6/002 336/119 |
| 5,485,317 | A * | 1/1996 | Perissinotto ......... | G02B 6/0001 257/E33.059 |
| 5,966,868 | A * | 10/1999 | Cox ..................... | A01K 45/002 119/69.5 |
| 6,367,950 | B1 * | 4/2002 | Yamada .................... | F21V 5/04 362/245 |
| 8,029,163 | B2 * | 10/2011 | Chen ......................... | F21V 5/04 362/308 |
| 8,152,327 | B2 * | 4/2012 | Brands .................... | F21L 4/027 359/800 |
| 8,231,248 | B2 * | 7/2012 | Fu ............................ | F21V 5/04 362/308 |

(Continued)

*Primary Examiner* — Alexander K Garlen
*Assistant Examiner* — Eric T Eide
(74) *Attorney, Agent, or Firm* — Prakash Nama; Global IP Services, PLLC

(57) ABSTRACT

The present invention is a novel light-emitting basin which includes a body. A surface of the body protrudes or is recessed to form a chamber. The body and/or a chamber wall of the chamber is in an atypical shape or a polyhedron shape. At least part of the chamber wall of the chamber forms a luminous body which is light reflective or light refractive. By using the novel light-emitting basin of the present invention, the surface of the body protrudes or is recessed to form a chamber. Fittings such as electric parts can be disposed in the chamber and thus could not be damaged easily.

10 Claims, 6 Drawing Sheets

(56) References Cited

U.S. PATENT DOCUMENTS

| | | | |
|---|---|---|---|
| 8,238,050 B2* | 8/2012 | Minano | F21V 7/04 |
| | | | 359/834 |
| 2004/0246606 A1* | 12/2004 | Benitez | G02B 3/02 |
| | | | 359/858 |
| 2005/0133088 A1* | 6/2005 | Bologeorges | H01L 31/042 |
| | | | 136/244 |
| 2006/0201052 A1* | 9/2006 | Wilbanks | A01M 1/04 |
| | | | 43/113 |
| 2010/0102141 A1* | 4/2010 | Landvik | B05B 17/08 |
| | | | 239/17 |
| 2013/0265750 A1* | 10/2013 | Pickard | F21V 21/088 |
| | | | 362/184 |

* cited by examiner

LIGHT-EMITTING BASIN

BACKGROUND OF THE INVENTION

The present invention relates to an aesthetically pleasing light-emitting basin with lighting function.

Conventional lighting apparatus with single function are mostly used for lighting. With the trend towards a diversified and personalized life, lighting apparatus used in environment such as indoor and outdoor and courtyard have also increased. These lighting apparatus have to satisfy the decorative need, and sealability has to be taken into consideration when used outdoors. Thus, the structure of a lighting component and location where it will be placed are particularly important. In addition, the lamp beads used in the lighting apparatus are in one single color. The lighting effect produced is monotonous. It cannot be fully blended into the environment in which it is used.

Thus, the applicant has applied for a "solar-powered bird bath" under publication number CN102871570A, which comprises a basin body, a base box and a solar panel, wherein the base box is installed at the bottom of the basin body, and the solar panel is provided on the base box.

However, the following problems exist in such bird bath: 1. A light-emitting LED light is installed on a lateral surface of the base box. Only part of the bottom of the basin body near the LED light is brightened, while a very big part of the basin body still cannot be brightened, thus failing to achieve an ideal night view decorative effect. 2. Fittings such as electric parts are exposed, thus affecting the overall appearance of products. 3. If the product adopts a table-top configuration, the pressure point of the whole product is on the electric parts; the electric parts are damaged easily.

BRIEF SUMMARY OF THE INVENTION

In view of the aforesaid disadvantages now present in the prior art, the present invention aims to provide a novel light-emitting basin which can both improve the illuminating effect and accommodate the fittings.

To attain this, the technical solution of the present invention is as follows:

A novel light-emitting basin comprises a body. A surface of the body protrudes or is recessed to form a chamber. The body and/or a chamber wall of the chamber is in an atypical shape or a polyhedron shape. At least part of the chamber wall of the chamber forms a luminous body which is light reflective or light refractive.

The luminous body is made into a translucent body with light-penetrative materials, and/or is made into a refractive body with light-reflective materials.

A bottom surface of the body protrudes inwards or is recessed inwards to form the chamber, and/or a top edge of a lateral chamber wall of the chamber is higher than, at a same level as or lower than a top edge of the body.

A light-emitting component is provided inside and/or outside the chamber to brighten the chamber wall of the chamber and brighten the body using light passing through the chamber wall.

The luminous body has one or more than two refractive indices.

A projected area of the luminous body accounts for 20-60% of a projected area of the body.

A projected area of the luminous body accounts for 30-40% of a projected area of the body.

The body is formed by glass, ceramic, resin, rubber, plastic material, plastic and/or metal.

The bottom surface of the body is provided with a light diffuser plate. The light diffuser plate is provided corresponding to light emitted from the light-emitting component.

The body and/or the light diffuser plate is opened with a through hole.

The novel light-emitting basin also comprises a power which provides electricity for the light-emitting component. The power is provided inside and/or outside the body, and/or is provided inside and/or outside the chamber, and/or is provided inside and/or outside the luminous body.

An interface is provided on the body and/or the light-emitting component of the novel light-emitting basin. The power electrically connects to the light-emitting component through the interface.

After adopting the above structure, the novel light-emitting basin of the present invention has the following the following advantages:

The surface of the body protrudes or is recessed to form a chamber. Fittings such as electric parts can be disposed in the chamber and thus could not be damaged easily. Besides, the light-emitting component can be provided inside and/outside the chamber as needed. Thus, the illuminating area and range of the light-emitting component can be freely provided without limiting to the bottom of the body, thereby improving the illuminating effect and achieving a night view decorative effect which is gorgeous and perfectly clear and bright. The body and the chamber are made into an atypical shape or a polyhedron shape. As ornamental crafts, they are highly ornamental, aesthetically pleasing and practical.

| Body | 1 | Chamber | 2 |
| --- | --- | --- | --- |
| Luminous body | 3 | Light diffuser plate | 4 |

-continued

| Interface | 41 | Through hole | 42 |
| Electric parts | 5 | Light-emitting component | 51 |
| Power | 52 | Wire | 53 |

DETAILED DESCRIPTION OF THE INVENTION

To further explain the technical proposal of the present invention, the present invention will be described in detail with reference to the embodiments below.

As illustrated in FIGS. 1-10, the novel light-emitting basin of the present invention comprises a body 1. The body 1 is made of glass, resin, metal, rubber, plastic, plastic material, ceramic, etc. It can be integrally molded or formed by combining or laminating the materials above.

Figure 4:
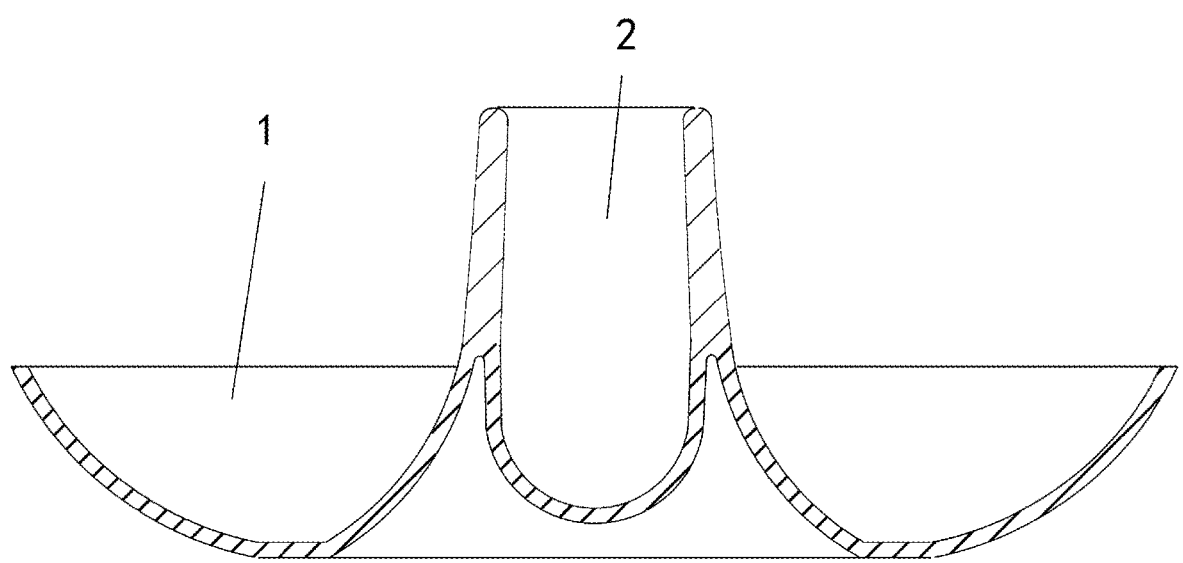
FIG. 4 is a cross-sectional view showing the chamber located above the body of the present invention.
Figure 5:
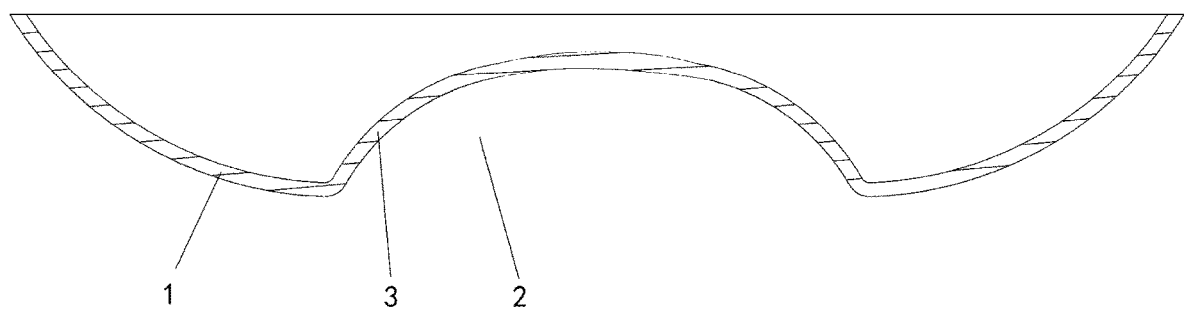
FIG. 5 is a cross-sectional view showing the chamber located below the body of the present invention.

The body 1 is in an atypical shape or a polyhedron shape. As illustrated in FIG. 4, viewing from the top, the center of the bottom of the body 1 is recessed inwards to form a chamber 2 above. Alternatively, as illustrated in FIG. 5, viewing from the top, the center of the bottom of the body 1 protrudes inwards to form a chamber 2 below.

The chamber 2 is in an atypical shape, a polyhedron shape, an inverted-trapezoidal shape, a dome shape or a bow shape. At least part of a chamber wall of the chamber 2 form a luminous body 3 which is light reflective or light refractive. The luminous body 3 is made into a translucent body with light-penetrative materials, so that light passes through the translucent body from inside to outside or from outside to inside, thus producing a variety of light changes such as refraction and diffused reflection. Alternatively, the luminous body 3 is made into a refractive body with light-reflective materials. Thus, the refractive body can reflect external light, which can also achieve a luminous effect.

Figure 1:
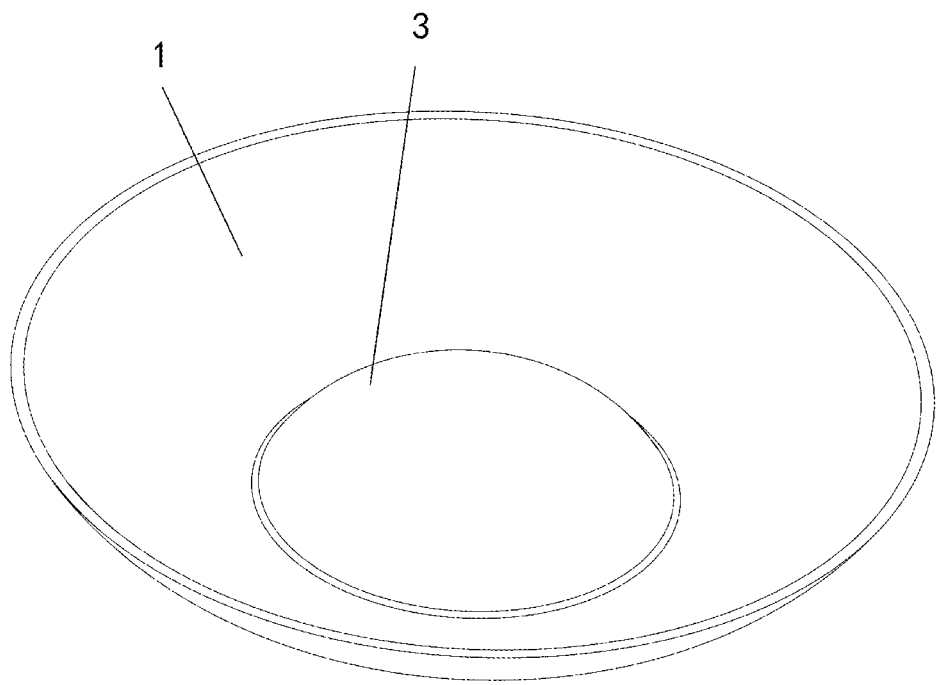
FIG. 1 is a perspective view of the novel light-emitting basin of the present invention.
Figure 2:
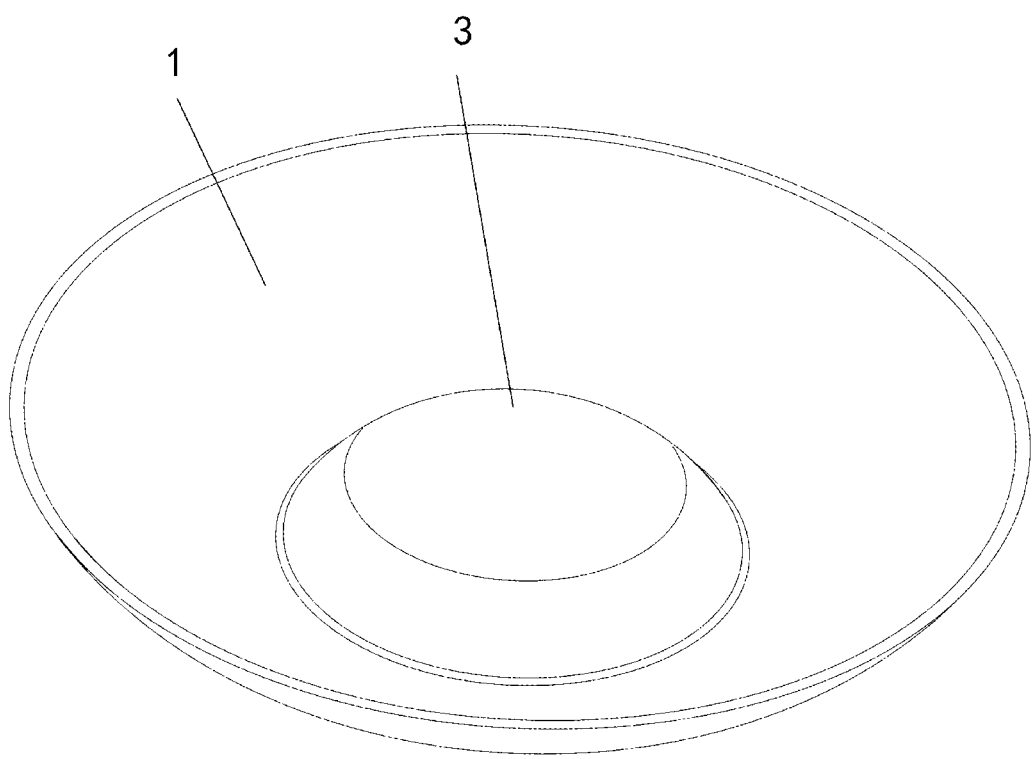
FIG. 2 is a schematic view showing the chamber of the present invention being cut horizontally.
Figure 3:
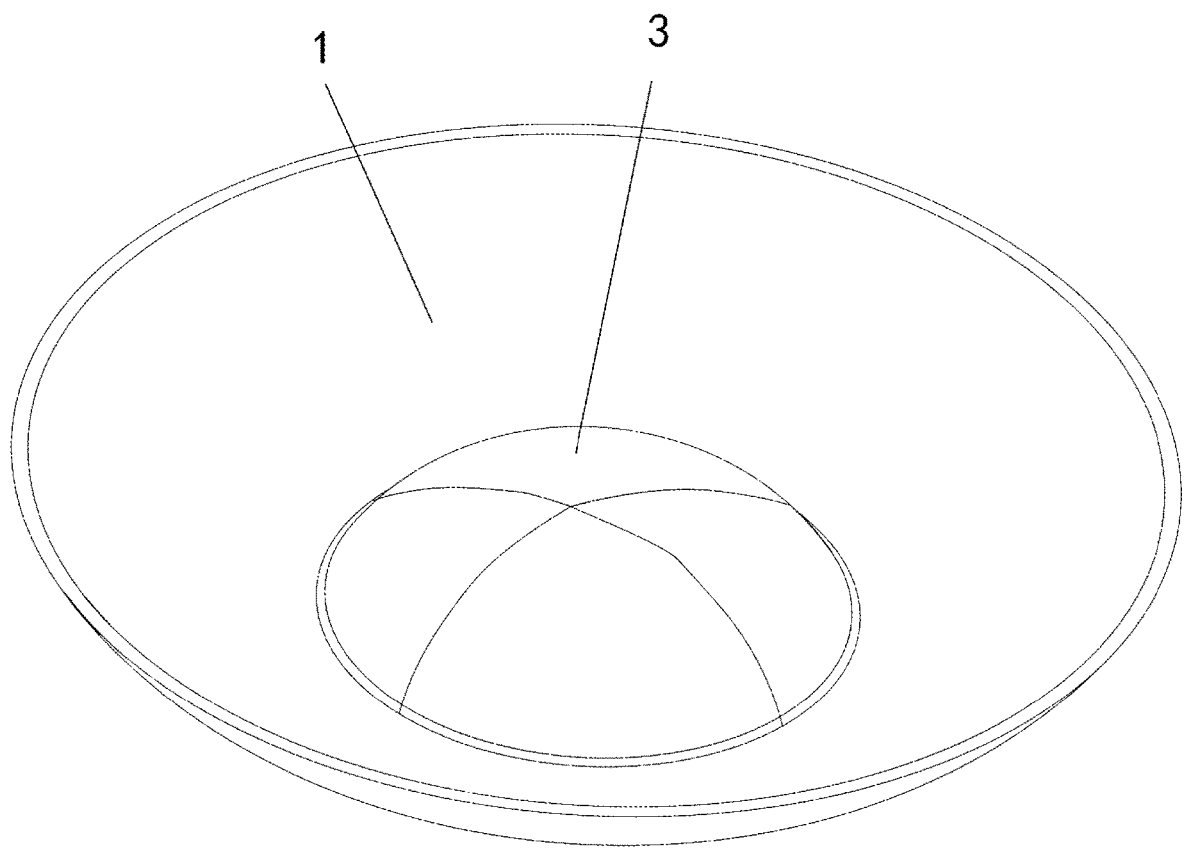
FIG. 3 is a schematic view showing the chamber of the present invention being cut vertically.

The luminous body 3 as illustrated in FIGS. 2 and 3 is split horizontally or vertically to form an atypical shape, a polyhedron shape or a dome shape with multiple refractive indices. The projected area of the luminous body 3 accounts for 20-60% of the projected area of the body 1, preferably 30-40%.

The light diffuser plate 4 is provided at the bottom of the body 1. The light diffuser plate 4 is assembled at the body 1 by means of adhering, rotatable fastening, fastening or close-fitting.

Electric parts 5 are placed in the chamber 2. Electric parts 5 mainly comprise circuit board, light-emitting component 51, power 52, etc.

Embodiment 1

As illustrated in FIG. 4, the body 1 is integrally molded into a basin shape by the use of glass. The bottom surface of the body 1 is recessed inwards to form the chamber 2 above. A lateral chamber wall of the chamber 2 extends upwards to form a conical or cylindrical shape, and the top edge of the lateral chamber wall is at the same level as or lower than the top edge of the body 1, preferably higher than the top edge of the body 1. A bottom chamber wall of the chamber 2 protrudes towards the bottom to form an arc shaped luminous body 3. The luminous body 3 can be made into a translucent body with light-penetrative materials.

Circuit board, power 52 etc. are placed in the chamber 2 above. The light-emitting component 51 can be provided inside and/or outside the chamber 2 above, and the light-emitting component 51 is roughly provided at a position higher than the top edge of the body 1. Thus, light emitted from the light-emitting component 51 can pass through the lateral chamber wall of the chamber 2 to brighten the body 1.

Embodiment 2

Figure 6:
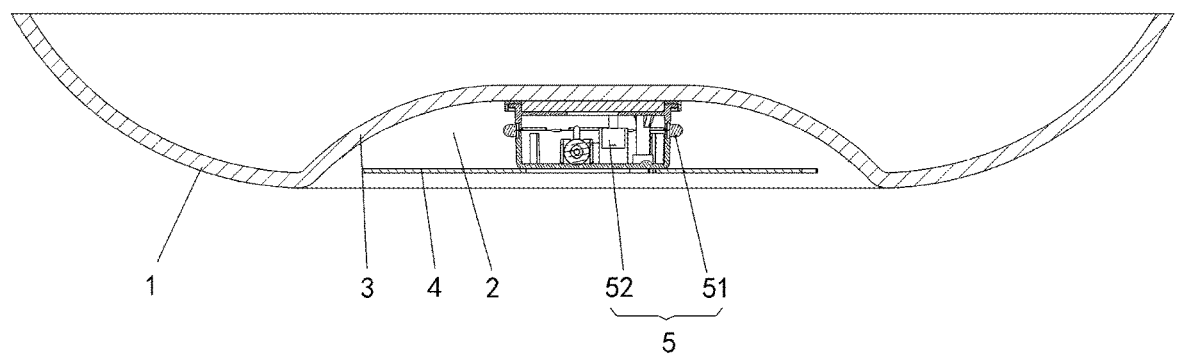
FIG. 6 is a schematic view showing the electric parts assembled in the chamber of the present invention.

As illustrated in FIG. 5, the bottom surface of the body 1 protrudes inwards to form the chamber 2 below. The top edge of a lateral chamber wall can also be higher, at the same level as or lower than the top edge of the body 1. As illustrated in FIG. 6, light-emitting component 51 is placed in the chamber 2 below.

Figure 6A:
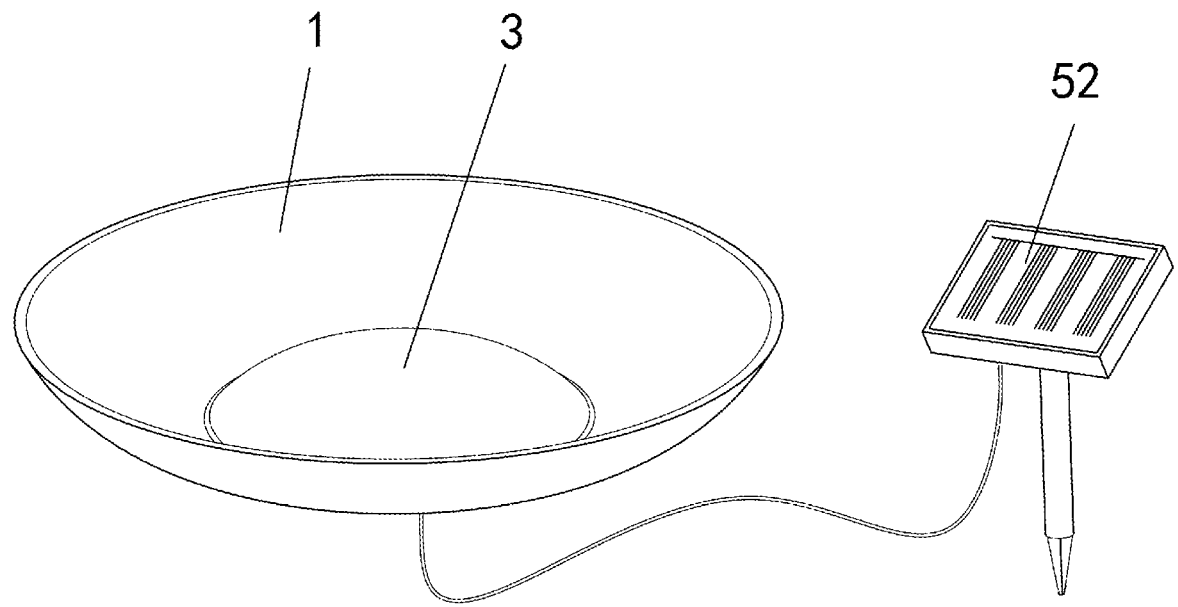
FIG. 6a is a schematic view showing a solar panel serving as the external power of the present invention.

As illustrated in FIG. 6a, the power 52 can be in form of an external solar panel, alternating current, DC power or battery cell. The power 52 electrically connects to the light-emitting component 51 through a wire.

Figure 6B:
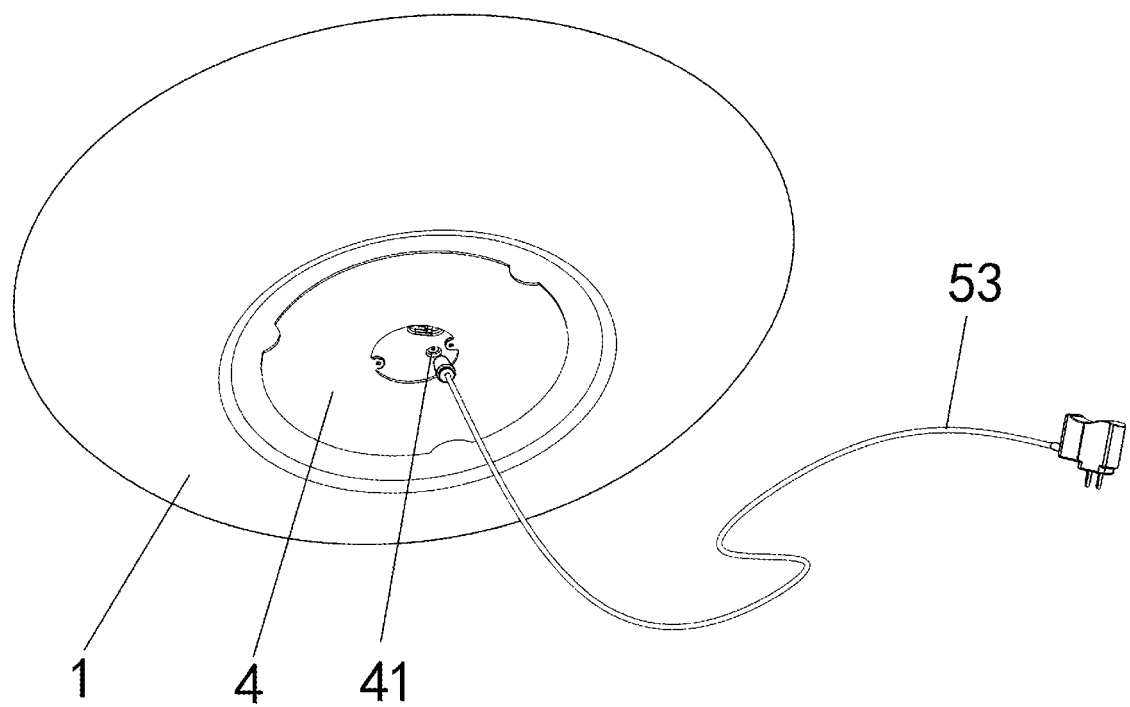
FIG. 6b is a schematic view showing the present invention connecting to the external power through the interface.

Electrical connecting methods can be in form of the following:

As illustrated in FIG. 6b, an interface 41 is provided on the light diffuser plate 4. The interface 41 can be a socket or a plug. The light-emitting component 51 electrically connects to an external solar panel, alternating current or DC power through the interface 41.

Figure 6C:
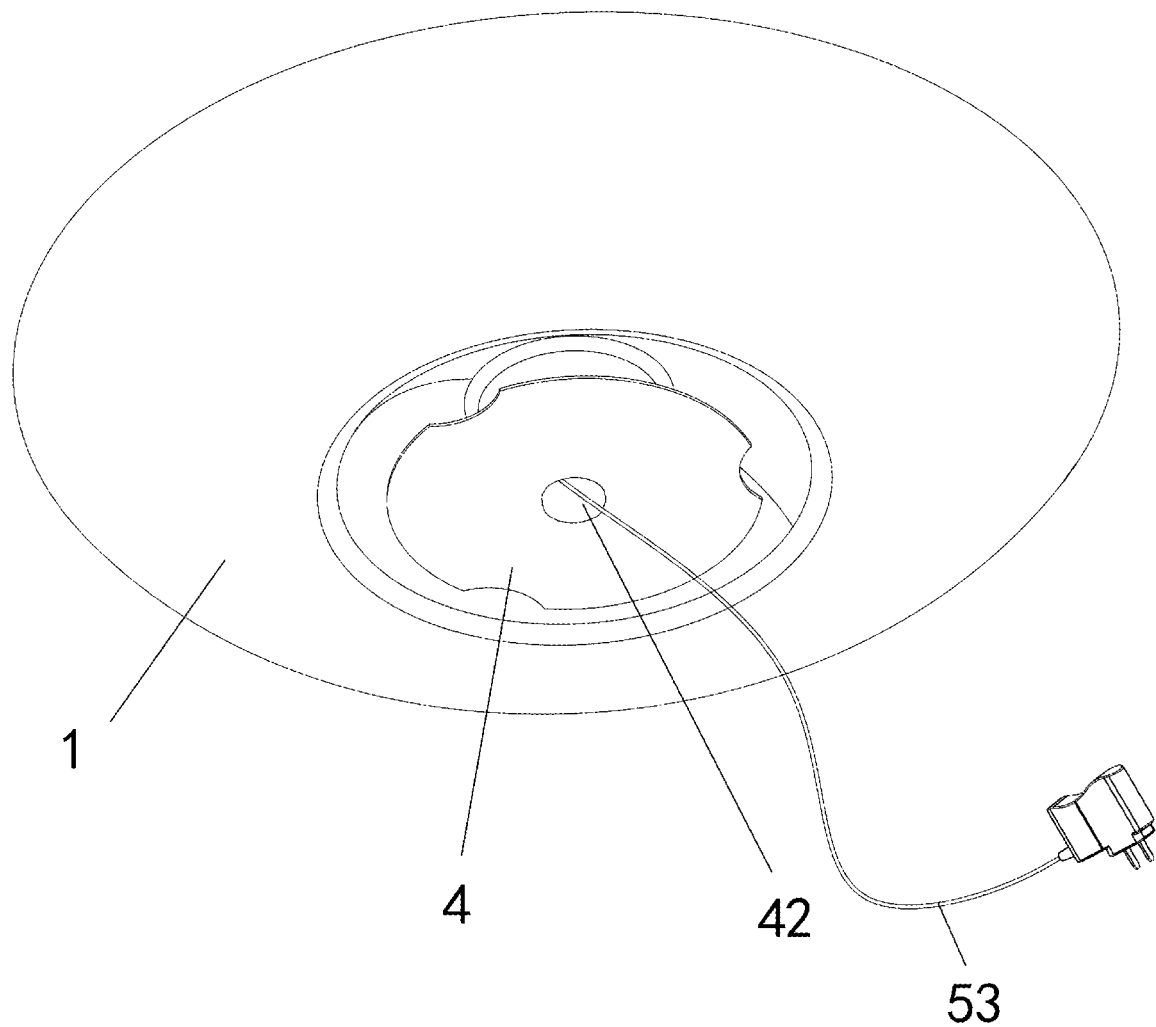
FIG. 6c is a schematic view showing the wire passing through the through hole to electrically connect to the external power.
Figure 7:
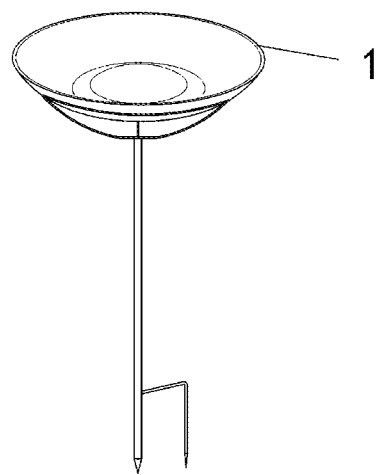
FIG. 7 is a schematic view showing the present invention being used as an inserted light in courtyard.
Figure 8:
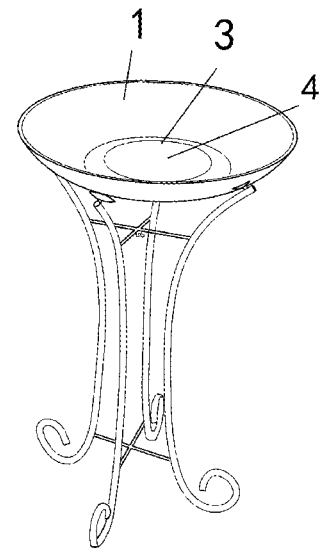
FIG. 8 is a schematic view showing the present invention being used as a bird bath or an ornamental pot.
Figure 9:
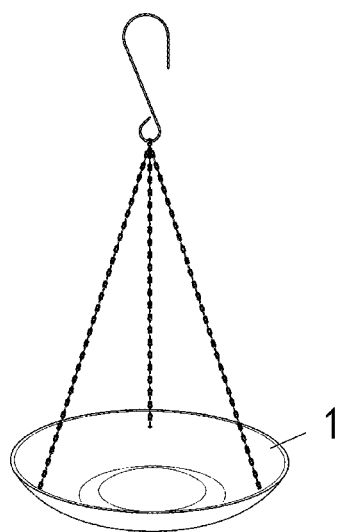
FIG. 9 is a schematic view showing the present invention being used as a hanging planter, a hanging basket or a pendant light.
Figure 10:
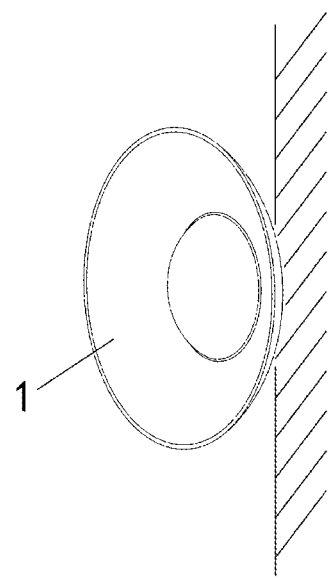
FIG. 10 is a schematic view showing the present invention being used as a bracket light or a wall light.

As illustrated in FIG. 6c, the light diffuser plate 4 is opened with a through hole 42. One end of the wire 53 passes through the through hole 42 and electrically connects to the light-emitting component 51. Another end of the wire 53 electrically connects to an external alternating current, DC power or solar panel.

Certainly, an interface and a through hole can also be provided on the body 1 or the light-emitting component 51, so that the light-emitting component 51 can electrically connect to the external solar panel, alternating current, DC power and battery cell.

In short, the power 52 can be provided inside and/or outside the body 1, and/or be provided inside and/or outside the chamber 2, and/or be provided inside and/or outside the luminous body 3.

The light-emitting component 51 can be in form of LED lamp beads. Part of the light emitted from the LED lamp beads passes through the translucent body. The other part of the light first passes through the light diffuser plate 4 at the bottom surface and then through the translucent body to turn the translucent body into a bright and gorgeous light package which does not only brighten the chamber wall of the chamber 2, but also further brighten the body 1 by the light passing from the chamber wall 2.

When in use as illustrated in FIGS. 7-10, the light-emitting basin is placed in an environment such as indoor and outdoor and courtyard. It can also be used as inserted light, bird bath, ornamental pot, hanging planter, hanging basket, pendant light, bracket light, wall light etc. in courtyard. With such bow-shaped translucent body absorbing the light emitted from the LED lamp beads provided in the chamber 2, the light concentrates in the entire chamber 2, which make the shape of the body 1 outstanding and highlight the patterns and colors on the chamber wall as well as the uneven patterns on the body 1 surface. Thus, the entire light-emitting basin is perfectly clear and bright, gorgeous and dazzling in the night. Also, after water is filled in the body 1, as the water in the basin ripples, patterns on the chamber wall of the chamber 2 and body 1 surface such as fish, dragon and grass appear more realistic, vivid and lively.

The present invention changes the sole ornamental function of conventional basins. It is both practical and aesthetically pleasing. Water and food are placed in the body 1, bringing convenience to lives with pets. As ornamental crafts, they are perfectly clear and bright, gorgeous and dazzling in the night. They have a high ornamental value and bring and visual enjoyment to people.

The foregoing embodiments and drawings are not limiting the product form and style of the present invention. All suitable modifications and equivalents made by those skilled in the art may be resorted to falling within the scope of the invention.

What is claimed is:

1. A novel light-emitting basin, characterized in that it comprises:
    a basin-shaped body being used as a bird bath;
    the body is integrally molded: a bottom surface of the body protrudes inwardly into the body to form a hollow chamber, a chamber wall of the chamber is in a polyhedron shape;
    the bottom of the chamber is provided with a light diffuser plate, causing the chamber to be formed into a hollow sealed or semi-sealed chamber;
    a light-emitting component and a power source which provides electricity for the light-emitting component are provided inside the chamber, the electricity is provided from an external solar panel;
    the light diffuser plate is provided corresponding to light emitted from the light-emitting component, causing the chamber wall of the chamber to form a luminous body which is light refractive;
    light emitted from the light-emitting component is absorbed by the luminous body, and concentrates in the chamber, to turn the luminous body into a bright light package which also brightens the body;
    the body is tucked from top to the bottom portion of the body to form a stand for supporting;
    wherein the luminous body is entirely made of a translucent body with light-penetrative materials.

2. The novel light-emitting basin as in claim 1, which is characterized in that a center of the bottom surface of the body protrudes inwardly into the body to form the chamber.

3. The novel light-emitting basin as in claim 1, which is characterized in that a top edge of the lateral chamber wall of the chamber is higher than, at a same level as or lower than a top edge of the body; the chamber wall of the chamber forms the luminous body which is in a bow-shape or an arc shape.

4. The novel light-emitting basin as in claim 1, which is characterized in that the luminous body has one or more than two refractive indices.

5. The novel light-emitting basin as in claim 1, which is characterized in that a projected area of the luminous body accounts for 20-60% of a projected area of the body.

6. The novel light-emitting basin as in claim 1, which is characterized in that a projected area of the luminous body accounts for 30-40% of a projected area of the body.

7. The novel light-emitting basin as in claim 1, which is characterized in that the body is formed by glass, ceramic, resin, rubber, plastic material, plastic or metal.

8. The novel light-emitting basin as in claim 1, which is characterized in that the body or the light diffuser plate is opened with a through hole.

9. The novel light-emitting basin as in claim 1, which is characterized in that the light diffuser plate is assembled at the bottom of the body by means of adhering, rotatable fastening, fastening or close-fitting.

10. The novel light-emitting basin as in claim 8, which is characterized in that an interface is provided on the light-emitting component; the power electrically connects to the light-emitting component through an interface.

* * * * *